(12) United States Patent
Seok

(10) Patent No.: US 9,532,187 B2
(45) Date of Patent: Dec. 27, 2016

(54) INTERLEAVER FOR PHYSICAL LAYER PROTOCOL DATA UNIT IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/823,524

(22) Filed: Aug. 11, 2015

(65) Prior Publication Data

US 2016/0044635 A1     Feb. 11, 2016

Related U.S. Application Data

(60) Provisional application No. 62/135,094, filed on Mar. 18, 2015.

(30) Foreign Application Priority Data

Aug. 11, 2014   (KR) ........................ 10-2014-0103275

(51) Int. Cl.
| | |
|---|---|
| *H04H 20/71* | (2008.01) |
| *H04W 4/06* | (2009.01) |
| *H04L 29/08* | (2006.01) |
| *H04L 1/00* | (2006.01) |
| *H04W 84/12* | (2009.01) |
| *H04L 1/06* | (2006.01) |

(52) U.S. Cl.
CPC .............. *H04W 4/06* (2013.01); *H04L 1/0071* (2013.01); *H04L 69/324* (2013.01); *H04L 1/0643* (2013.01); *H04W 84/12* (2013.01)

(58) Field of Classification Search
CPC ..... H04W 72/044; H04L 5/003; H04L 1/0071; H03M 13/271
See application file for complete search history.

(56) References Cited

U.S. PATENT DOCUMENTS

| | | | |
|---|---|---|---|
| 9,281,924 B2* | 3/2016 | Abraham ............... | H04L 5/0023 |
| 2012/0230448 A1* | 9/2012 | Kang ................. | H03M 13/6527 375/295 |
| 2013/0177090 A1* | 7/2013 | Yang ....................... | H04L 41/16 375/260 |
| 2013/0229996 A1* | 9/2013 | Wang ................ | H04W 72/0413 370/329 |
| 2015/0139248 A1* | 5/2015 | Katar .................... | H04L 1/1607 370/470 |
| 2016/0072654 A1* | 3/2016 | Choi ................... | H04L 27/2602 370/329 |

* cited by examiner

*Primary Examiner* — Shaq Taha

(57) ABSTRACT

The present invention provides a method and apparatus for transmitting using an interleaver applied to a PPDU in a HE WLAN. In an aspect of the present invention, a method for transmitting data to a plurality of STAs through transmission channel by an AP in a WLAN system, wherein the transmission channel is divided into a plurality of subchannels which are allocated to the plurality of STAs respectively, the method may include interleaving a plurality of data units for the plurality of STAs based on characteristics of the plurality of subchannels allocated to the plurality of STAs to generate a plurality of interleaved data units; and transmitting, through the transmission channel, a Physical layer Protocol Data Unit (PPDU) frame including the plurality of interleaved data units respectively on the plurality of subchannels to the plurality of STAs.

14 Claims, 14 Drawing Sheets

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 11

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-SIG-C | PSDU(AP to STA1,STA2) |

FIG. 12

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 to AP) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-LTF | HE-SIG-C | PSDU(STA1 to AP) |

INTERLEAVER FOR PHYSICAL LAYER PROTOCOL DATA UNIT IN A HIGH EFFICIENCY WIRELESS LAN

This application claims the benefit of Korean Patent Application No. 10-2014-0103275, filed on Aug. 11, 2014, which is hereby incorporated by reference as if fully set forth herein. This application claims the benefit of U.S. Provisional Application No. 62/135,094, filed on Mar. 18, 2015, which is hereby incorporated by reference as if fully set forth herein.

BACKGROUND OF THE INVENTION

Field of the Invention

The present invention relates to a Wireless Local Area Network (WLAN), and more particularly, to an interleaver, an interleaving procedure, a deinterleaver, a deinterleaving procedure applied to a Physical layer Protocol Data Unit (PPDU) in a High Efficiency WLAN (HEW), a transmission method, reception method, transmission apparatus, reception apparatus, and software using the interleaver, the interleaving procedure, the deinterleaver, the deinterleaving procedure, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a new interleaver, an interleaving procedure, a deinterleaver, and a deinterleaving procedure, for application to a High Efficiency WLAN Physical layer Protocol Data Unit (HE PPDU), and to efficiently support Multi-User Multiple Input Multiple Output (MU-MIMO) and Orthogonal Frequency Division Multiple Access (OFDMA) with the HE PPDU.

The objects of the present invention are not limited to the foregoing descriptions, and additional objects will become apparent to those having ordinary skill in the pertinent art to the present invention based upon the following descriptions.

In an aspect of the present invention, a method for transmitting data to a plurality of Stations (STAs) through transmission channel by an Access Point (AP) in a Wireless Local Area Network (WLAN) may be provided. The transmission channel may be divided into a plurality of subchannels which are allocated to the plurality of STAs respectively. The method may include interleaving a plurality of data units for the plurality of STAs based on characteristics of the plurality of subchannels allocated to the plurality of STAs to generate a plurality of interleaved data units; and transmitting, through the transmission channel, a Physical layer Protocol Data Unit (PPDU) frame including the plurality of interleaved data units respectively on the plurality of subchannels to the plurality of STAs.

In another aspect of the present invention, a method for receiving data from an AP through a transmission channel by a first STA among a plurality of STAs in a WLAN may be provided. The transmission channel may be divided into a plurality of subchannels which are allocated to the plurality of STAs respectively. The method may include receiving, through the transmission channel, a Physical layer Protocol Data Unit (PPDU) frame including a plurality of data units for the plurality of STAs respectively on the plurality of subchannels to acquire a data unit for the first STA from a subchannel allocated to the first STA; and deinterleaving the data unit for the first STA based on a characteristic of the subchannel allocated to the first STA.

In another aspect of the present invention, an AP apparatus for transmitting data to a plurality of STAs through transmission channel in a WLAN may be provided. The transmission channel may be divided into a plurality of subchannels which are allocated to the plurality of STAs respectively. The AP apparatus may include a baseband processor, a Radio Frequency (RF) transceiver, and a memory. The baseband processor may be configured to interleave a plurality of data units for the plurality of STAs based on characteristics of the plurality of subchannels allocated to the plurality of STAs to generate a plurality of interleaved data units; and to transmit, through the transmission channel, using the transceiver, a PPDU frame including the plurality of interleaved data units respectively on the plurality of subchannels to the plurality of STAs.

In another aspect of the present invention, a first STA apparatus for receiving data from an AP through a transmission channel among a plurality of STAs in a WLAN may be provided. The transmission channel may be divided into a plurality of subchannels which are allocated to the plurality of STAs respectively. The first STA apparatus may include a baseband processor, an RF transceiver, and a memory. The baseband processor may be configured to receive, through the transmission channel, using the transceiver, a PPDU frame including a plurality of data units for the plurality of STAs respectively on the plurality of subchannels to acquire a data unit for the first STA from a subchannel allocated to the first STA; and to deinterleave the data unit for the first STA based on a characteristic of the subchannel allocated to the first STA.

In an aspect of the present invention, a software or computer-readable medium having instructions executable for an AP to transmit data to a plurality of STAs through transmission channel in a WLAN may be provided. The transmission channel may be divided into a plurality of subchannels which are allocated to the plurality of STAs respectively. The executable instructions may operate the AP to interleave a plurality of data units for the plurality of STAs based on characteristics of the plurality of subchannels allocated to the plurality of STAs to generate a plurality of interleaved data units; and to transmit, through the transmission channel, a PPDU frame including the plurality of interleaved data units respectively on the plurality of subchannels to the plurality of STAs.

In another aspect of the present invention, a software or computer-readable medium having instructions executable for a first STA to receive data from an AP through a transmission channel among a plurality of STAs in a WLAN may be provided. The transmission channel may be divided into a plurality of subchannels which are allocated to the plurality of STAs respectively. The executable instructions may operate the STA to receive, through the transmission channel, a PPDU frame including a plurality of data units for the plurality of STAs respectively on the plurality of subchannels to acquire a data unit for the first STA from a subchannel allocated to the first STA; and to deinterleave the data unit for the first STA based on a characteristic of the subchannel allocated to the first STA.

It is to be understood that both the foregoing summarized features are exemplary aspects of the following detailed description of the present invention without limiting the scope of the present invention.

According to the present invention, a new interleaver, an interleaving procedure, a deinterleaver, and a deinterleaving procedure can be provided, for application to a High Efficiency WLAN Physical layer Protocol Data Unit (HE PPDU), and Multi-User Multiple Input Multiple Output (MU-MIMO) and Orthogonal Frequency Division Multiple Access (OFDMA) can be efficiently supported with the HE PPDU.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention;

DETAILED DESCRIPTION OF THE INVENTION

Figure 1:
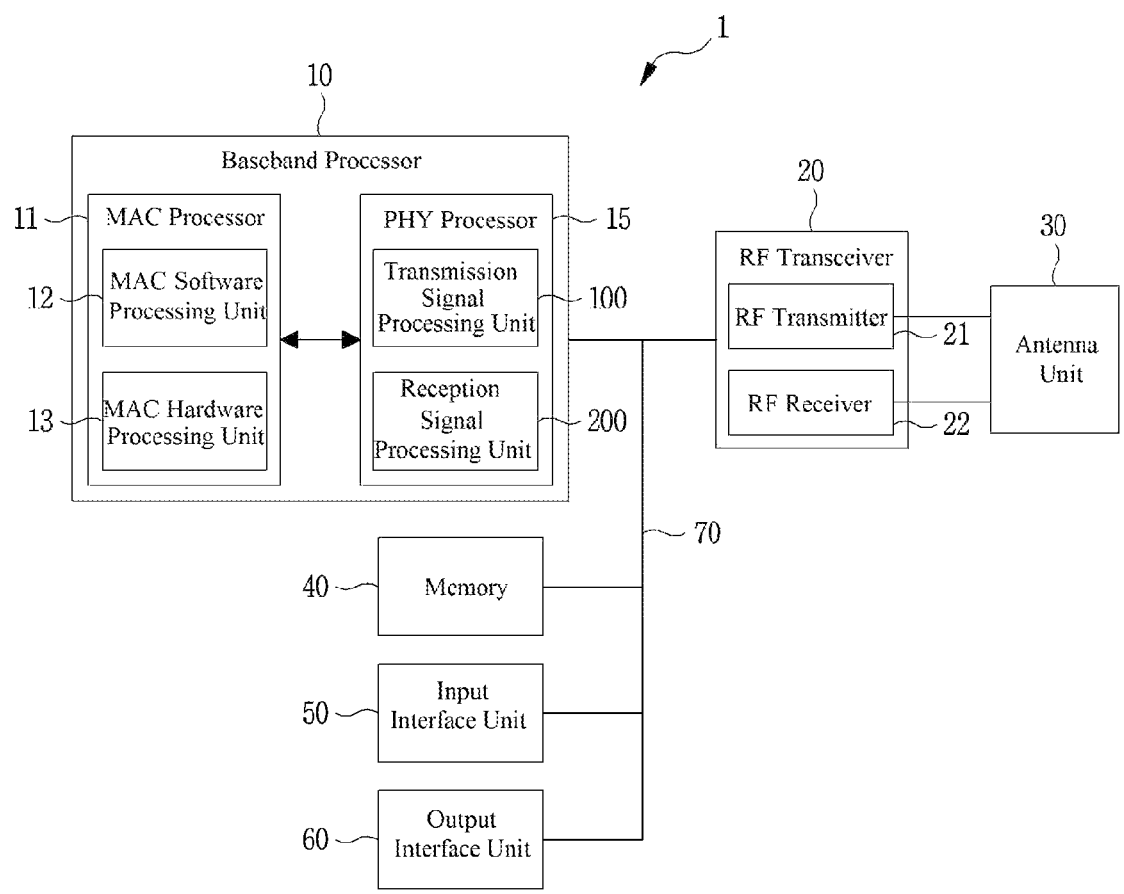
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer in conformance to Institute of Electrical and Electronics Engineers (IEEE) 802.11 series standards. At least one of the WLAN devices may be an Access Point (AP) and the other WLAN devices may be non-AP Stations (non-AP STAs). Alternatively, all of the WLAN devices may be non-AP STAs in an ad-hoc network. Generally, the term STA covers AP STA and non-AP STA. However, only a non-AP STA may be referred to as a STA, for the convenience's sake.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmission signal processing unit 100 and a reception signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
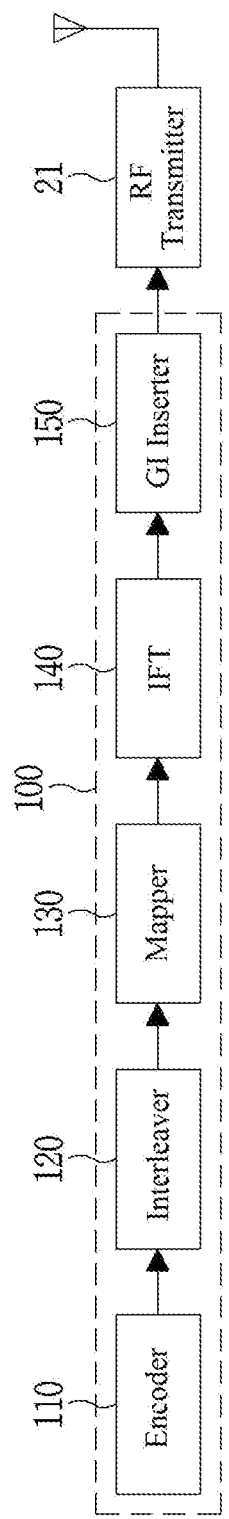
FIG. 2 is a schematic block diagram of an exemplary transmission signal processing unit in a WLAN.

FIG. 2 is a schematic block diagram of an exemplary transmission signal processor in a WLAN.

Referring to FIG. 2, the transmission signal processing unit 100 includes an encoder 110, an interleaver 120, a mapper 130, an Inverse Fourier Transform (IFT) processor 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmission signal processing unit 100 may further include a scrambler for scrambling input data before encoding to reduce the probability of long sequences of 0s or 1s. If a BCC encoding scheme is used in the encoder 110, the transmission signal processing unit 100 may further include an encoder parser for demultiplexing the scrambled bits among a plurality of BCC encoders. If an LDPC encoding scheme is used in the encoder 110, the transmission signal processing unit 100 may not use the encoder parser.

The interleaver 120 interleaves the bits of each stream output from the encoder 110 to change orders of bits. Interleaving may be applied only when a BCC encoding scheme is used in the encoder 110. The mapper 130 maps a sequence of bits output from the interleaver 120 to constellation points. If an LDPC encoding scheme is used in the encoder 110, the mapper 130 may further perform LDPC tone mapping besides the constellation point mapping.

In MIMO or MU-MIMO, the transmission signal processing unit 100 may use as many interleavers 120 as and as many mappers 130 as the number $N_{SS}$ of spatial streams. In this case, the transmission signal processing unit 100 may further include a stream parser for dividing the outputs of the BCC encoders or the output of the LDPC encoder into a plurality of blocks to be provided to the different interleavers 120 or mappers 130. The transmission signal processing unit 100 may further include a Space-Time Block Code (STBC) encoder for spreading the constellation points from $N_{SS}$ spatial streams into $N_{STS}$ space-time streams and a spatial mapper for mapping the space-time streams to transmit chains. The spatial mapper may use direct mapping, spatial expansion, or beamforming.

The IFT processor 140 converts a block of constellation points output from the mapper 130 or the spatial mapper to a time-domain block (i.e., a symbol) by Inverse Discrete Fourier Transform (IDFT) or Inverse Fast Fourier Transform (IFFT). If the STBC encoder and the spatial mapper are used, the IFT processor 140 may be provided for each transmit chain.

In MIMO or MU-MIMO, the transmission signal processing unit 100 may insert Cyclic Shift Diversities (CSDs) in order to prevent unintended beamforming A CSD insertion may applied before or after IFT. A CSD may be specified for each transmit chain or for each space-time stream. Alternatively, the CSD may be applied as a part of the spatial mapper.

In MU-MIMO, some blocks before the spatial mapper may be provided for each user.

The GI inserter 150 prepends a GI to a symbol. The transmission signal processing unit 100 may optionally perform windowing to smooth edges of each symbol after inserting the GI. The RF transmitter 21 converts the symbols into an RF signal and transmits the RF signal via the antenna unit 30. In MIMO or MU-MIMO, the GI inserter 150 and the RF transmitter 21 may be provided for each transmit chain.

Figure 3:
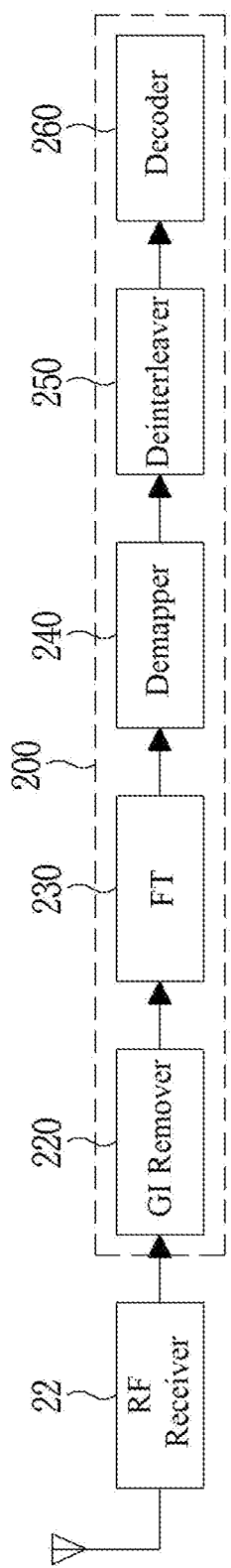
FIG. 3 is a schematic block diagram of an exemplary reception signal processing unit in a WLAN.

FIG. 3 is a schematic block diagram of an exemplary a reception signal processor in a WLAN.

Referring to FIG. 3, the reception signal processing unit 200 includes a GI remover 220, a Fourier Transform (FT) processor 230, a demapper 240, a deinterleaver 250, and a decoder 260.

The RF receiver 22 receives an RF signal via the antenna unit 30 and converts the RF signal into symbols. The GI remover 220 removes a GI from the symbols. In MIMO or MU-MIMO, the RF receiver 22 and the GI remover 220 may be provided for each receive chain.

The FT 230 converts the symbol (i.e., the time-domain block) into a block of constellation points by Discrete Fourier Transform (DFT) or Fast Fourier Transform (FFT). The FT processor 230 may be provided for each receive chain.

In MIMO or MU-MIMO, the reception signal processing unit 200 may include a spatial demapper for converting Fourier Transformed receiver chains to constellation points of space-time streams, and an STBC decoder for despreading the constellation points from the space-time streams into the spatial streams.

The demapper 240 demaps constellation points output from the FT processor 230 or the STBC decoder to bit streams. If an LDPC encoding scheme has been applied to the received signal, the demapper 240 may further perform LDPC tone demapping before the constellation demapping. The deinterleaver 250 deinterleaves the bits of each of the streams output from the demapper 240. Deinterleaving may be applied only when a BCC encoding scheme has been applied to the received signal.

In MIMO or MU-MIMO, the reception signal processing unit 200 may use as many demappers 240 as and as many deinterleavers 250 as the number of spatial streams. In this case, the reception signal processing unit 200 may further include a stream deparser for combining streams output from the deinterleavers 250.

The decoder 260 decodes streams output from the deinterleaver 250 or the stream deparser. For example, the decoder 100 may be an FEC decoder. The FEC decoder may include a BCC decoder or an LDPC decoder. The reception signal processing unit 200 may further include a descrambler for descrambling the decoded data. If a BCC decoding scheme is used in the decoder 260, the reception signal processing unit 200 may further include an encoder deparser for multiplexing data decoded by a plurality of BCC decoders. If an LDPC decoding scheme is used in the decoder 260, the reception signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
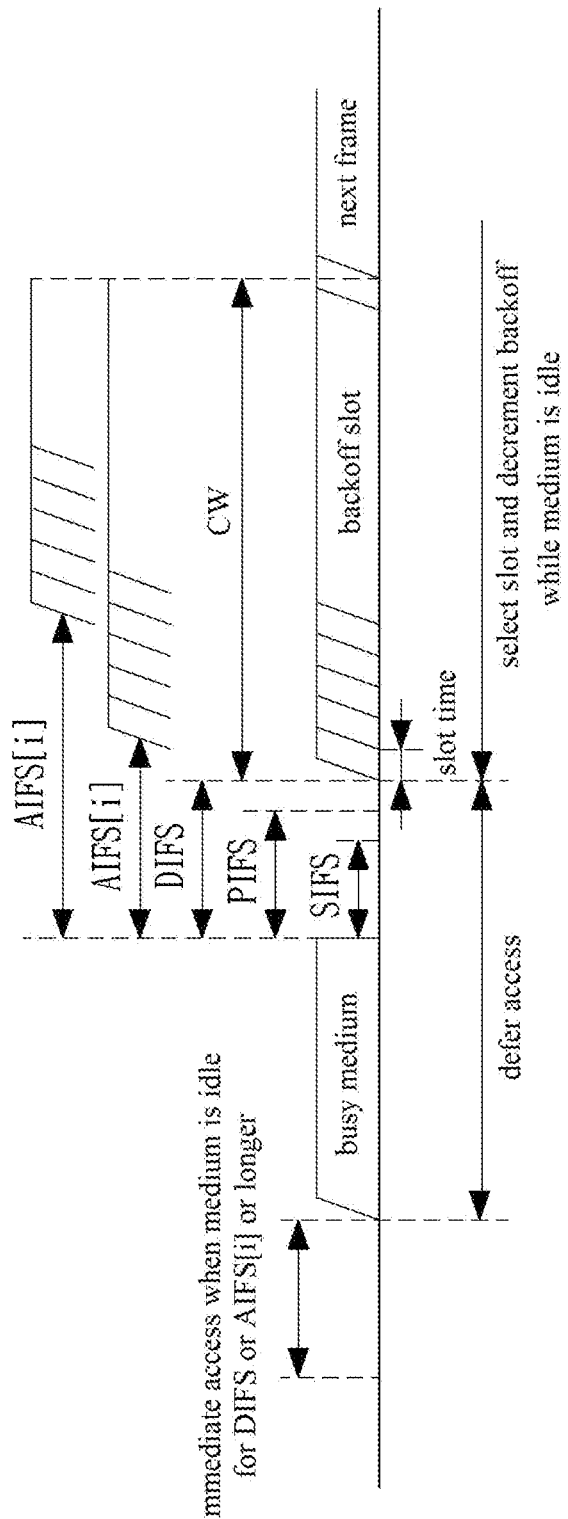
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data to be forwarded to a higher layer. After a Distributed Coordination Function IFS (DIFS) from a time when a medium gets idle, a WLAN device performs a backoff and then transmits a data frame. A management frame is used for exchanging management information which is not forwarded to the higher layer. After an IFS such as the DIFS or a Point Coordination Function IFS (PIFS), the WLAN device transmits the management frame. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. If the control frame is not a response frame to another frame, the WLAN device performs a backoff after the DIFS and then transmits the control frame; or if the control frame is a response frame to another frame, the WLAN device transmits the control frame after a Short IFS (SIFS) without a backoff. The type and subtype of a frame may be identified by a type field and a subtype field in a Frame Control (FC) field.

On the other hand, a Quality of Service (QoS) STA may perform a backoff after an Arbitration IFS (AIFS) for Access Category (AC), i.e., AIFS[i] (i is determined based on AC) and then transmit a frame. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
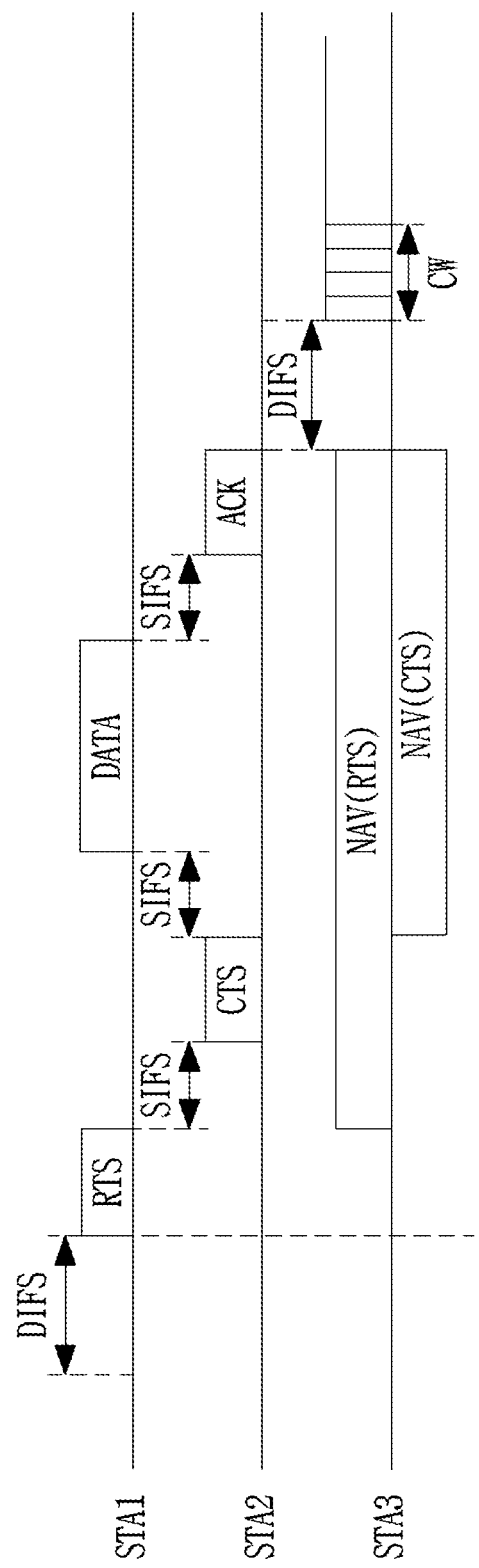
FIG. 5 is a conceptual diagram illustrating a procedure for transmitting a frame in Carrier Sense Multiple Access with Collision Avoidance (CSMA/CA) to avoid collision between frames on a channel.

FIG. 5 is a conceptual diagram illustrating a CSMA/CA-based frame transmission procedure to avoid collision between frames on a channel.

Referring FIG. 5, a first STA (STA1) is a transmitting WLAN device having data to be transmitted, a second STA (STA2) is a receiving WLAN device to receive the data from STA1, and a third STA (STA3) is a WLAN device located in an area where STA3 may receive a frame from STA1 and/or STA2.

STA1 may determine whether a channel is busy by carrier sensing. STA1 may determine channel occupancy based on an energy level of the channel or a correlation between signals on the channel, or using a Network Allocation Vector (NAV) timer.

If STA1 determines that the channel is not used by other devices during a DIFS (that is, the channel is idle), STA1 may transmit an RTS frame to STA2 after performing a backoff. Upon receipt of the RTS frame, STA2 may transmit a CTS frame as a response to the CTS frame after a SIFS.

Upon receipt of the RTS frame, STA3 may set a NAV timer for a transmission duration of following frames (e.g., a SIFS time+a CTS frame duration+a SIFS time+a data frame duration+a SIFS time+an ACK frame duration), based on duration information included in the RTS frame. Upon receipt of the CTS frame, STA3 may set the NAV timer for a transmission duration of following frames (e.g., a SIFS time+a data frame duration+a SIFS time+an ACK frame duration), based on duration information included in the CTS frame. Upon receipt of a new frame before the NAV timer expires, STA3 may update the NAV timer based on duration information included in the new frame. STA3 does not attempt to access the channel until the NAV timer expires.

Upon receipt of the CTS frame from STA2, STA1 may transmit a data frame to STA2 a SIFS after the CTS frame has been completely received. Upon successful receipt of the data frame from STA1, STA2 may transmit an ACK frame as a response to the data frame after a SIFS.

Upon expiration of the NAV timer, STA3 may determine whether the channel is busy by carrier sensing. If STA3 determines that the channel is not in use by the other devices during a DIFS after expiration of the NAV timer, STA3 may attempt channel access after a convention window according a random backoff-based CW.

Figure 6:
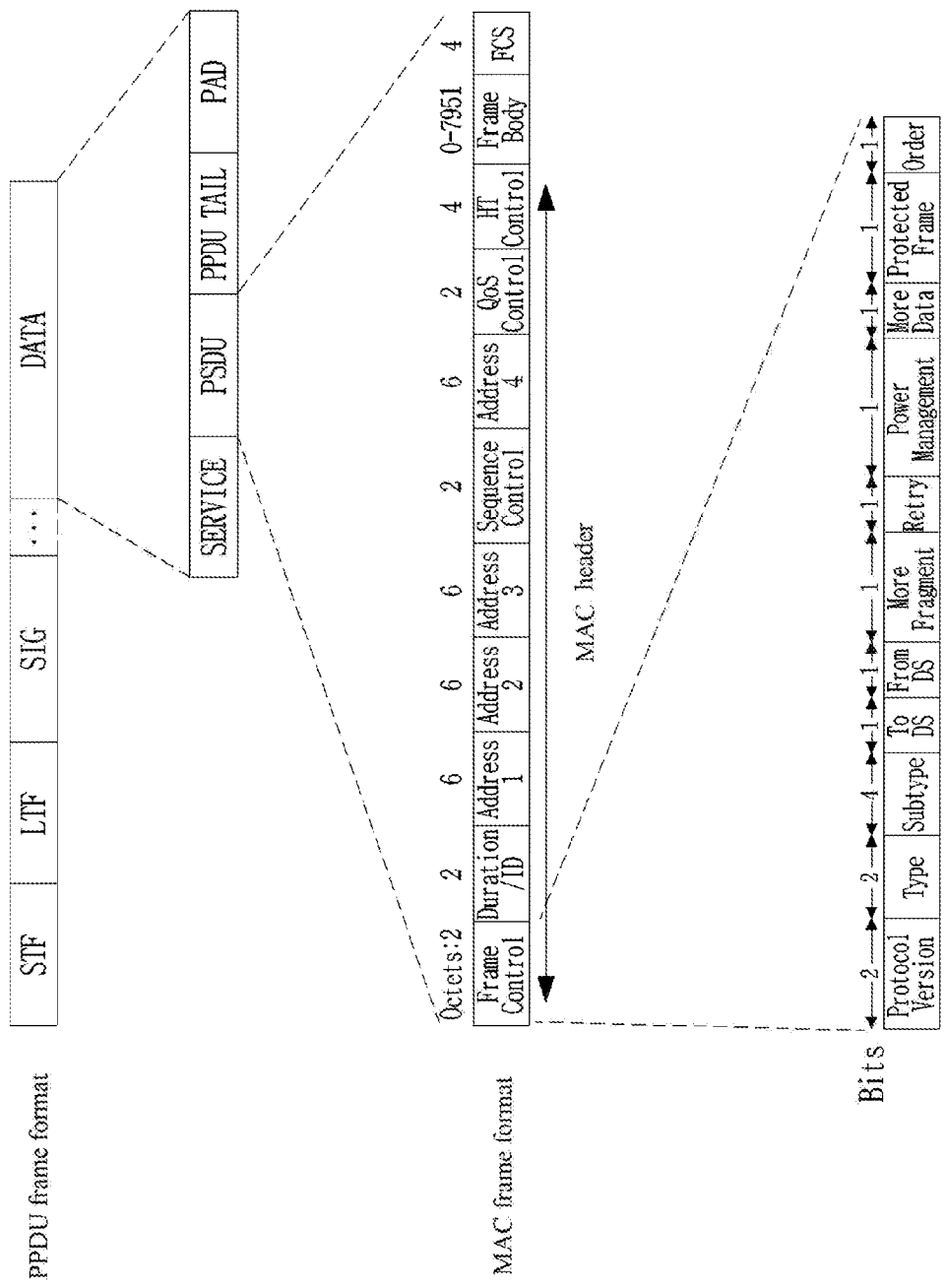
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
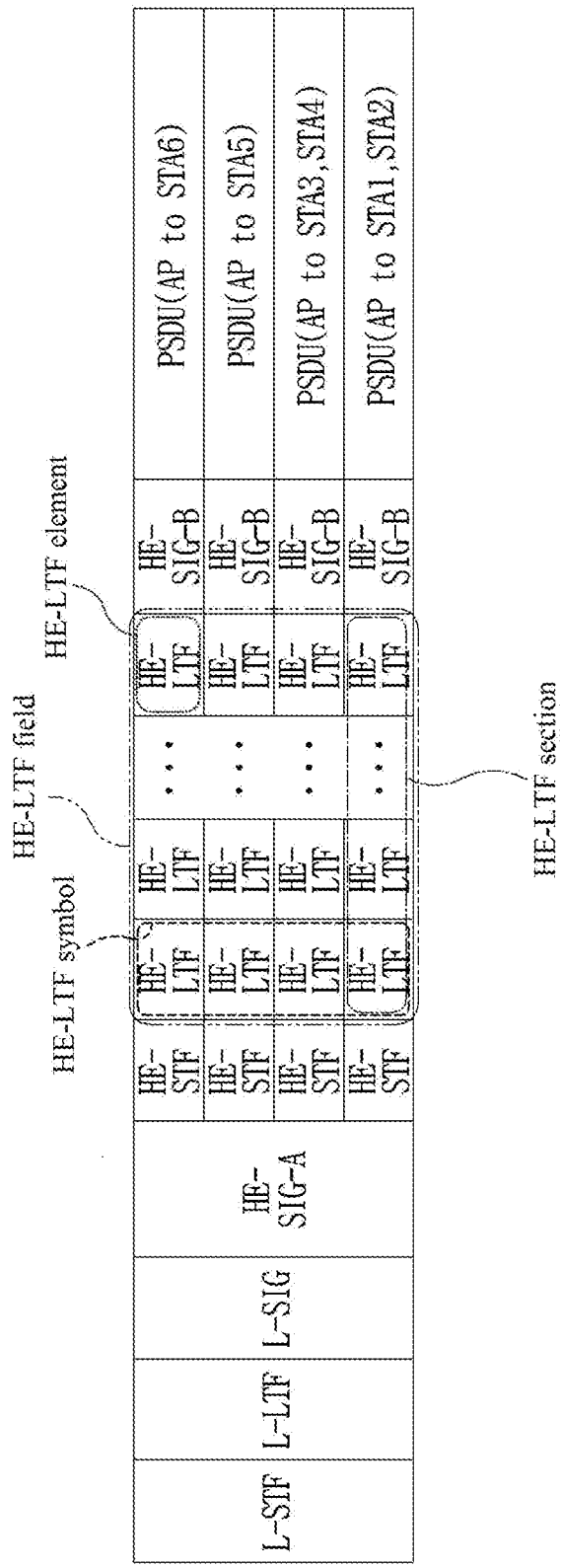
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU:<br>Set to 1 if space time block coding is used and set to 0 otherwise.<br>For a VHT MU PPDU:<br>Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates coding for user u with USER_POSITION[u] = 3: set to 0 for BCC, 1 for LDPC. If the MU[3] NSTS field is 0, then |

TABLE 1-continued

| Two parts of VHT-SIG-A | Bit | Field | Number of bits | Description |
|---|---|---|---|---|
| | | | | B6 is reserved and set to 1. |
| | | | | B7 is reserved and set to 1 |
| | B8 | Beamformed | 1 | For a VHT SU PPDU: |
| | | | | Set to 1 if a Beamforming steering matrix is applied to the waveform in an SU transmission as described in 20.3.11.11.2, set to 0 otherwise. |
| | | | | For a VHT MU PPDU: |
| | | | | Reserved and set to 1 |
| | | | | NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
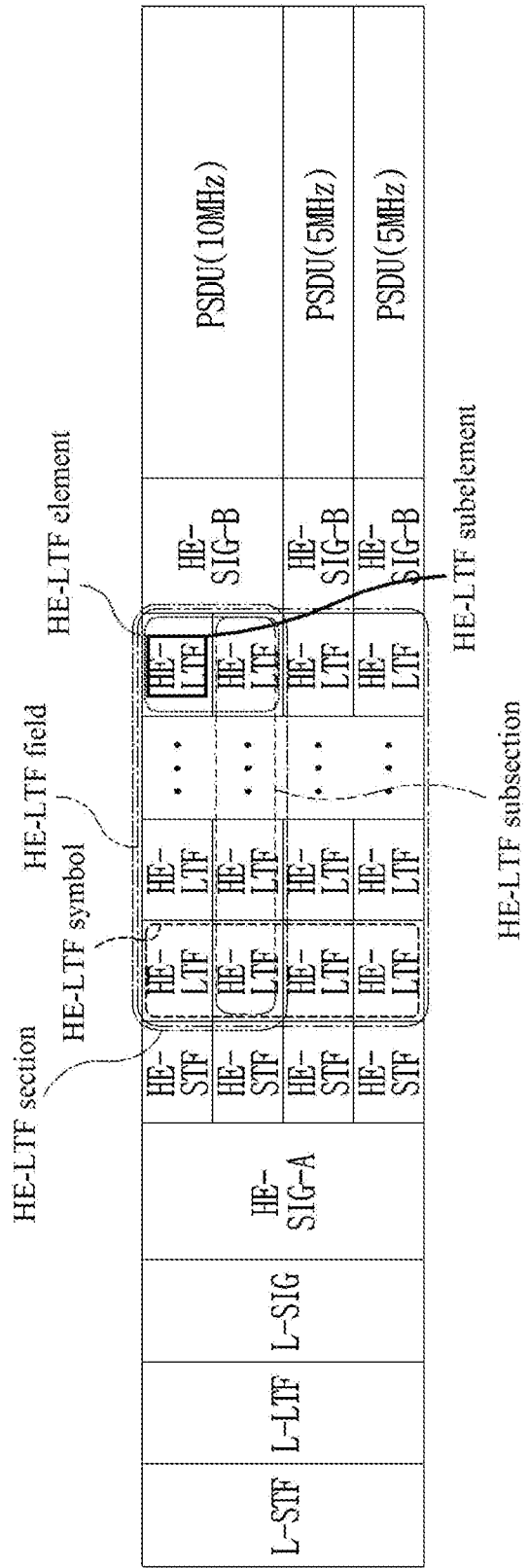
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
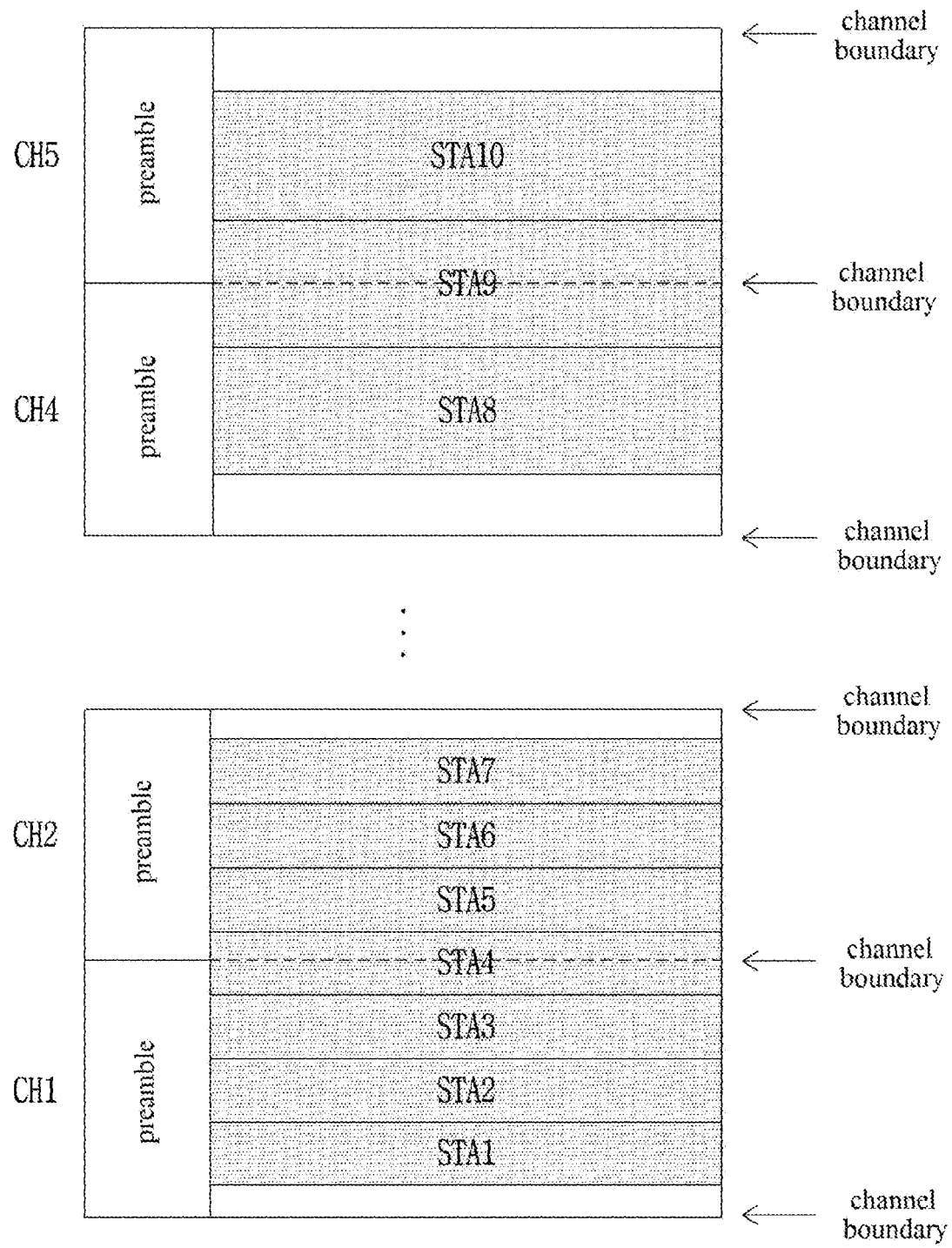
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be understood that it is applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before with reference to FIG. 2, a block interleaver may interleave coded data bits. The interleaver performs 3-stage permutation. Adjacent coded bits are mapped to non-adjacent subcarriers by the first permutation. Adjacent coded bits are mapped alternately between less significant bits and more significant bits by the second permutation. Thus, long continuation of less reliable bits may be avoided. The third permutation corresponds to frequency rotation.

Now, a description will be given of an interleaving scheme or an interleaver which is applied to OFDM symbols in a HE PPDU frame format supporting MU-MIMO or OFDMA (i.e., MU transmission).

In the HE PPDU frame format, a DATA field (or a PSDU) may be transmitted independently on a subchannel. In this case, processes for PSDU transmission (e.g., encoding, interleaving, padding, modulation, etc. of a PSDU) may be performed independently on a subchannel basis. For example, if interleaving is independently applied to each subchannel, this means that a first interleaver may be used for a first subchannel, a second interleaver may be used for a second subchannel, the first and second subchannels may be different, and the first and second interleavers may be same or different. Independent PSDU processing on a subchannel basis means that PSDU processing for each subchannel is logically independent, which is said to facilitate description of PSDU processing from the viewpoint of one subchannel. This does not mean that a PSDU is not necessary processed individually or separately for each subchannel.

For example, in the case where the size of FFT applied to a PSDU of a HE PPDU frame transmitted on one channel (e.g., a 20-MHz channel bandwidth) is 256 (i.e., if 256-FFT is used for the PSDU), if a PSDU is transmitted on each of 16 subchannels of the channel, it may be said that 16-FFT is applied to a PSDU on one subchannel (i.e., one subchannel has up to 16 subcarrier or up to 16 tones). In other words, in the case where 256-FFT is used for a PSDU in a HE PPDU frame transmitted on one channel (e.g., a 20-MHz channel bandwidth), if a PSDU is transmitted on each of X subchannels having the same bandwidth in the channel, it may be said that 256/X-FFT is applied to a PSDU on one subchannel (i.e., one subchannel has up to 256/X subcarriers or up to 256/X tones). On the other hand, if 256-FFT is used for PSDU transmission for one destination STA on one channel which is not divided into subchannels, it may be said that the PSDU transmission has 256 subcarriers (or 256 tones) in one OFDM symbol.

First, parameters are defined, which are used in the following description of an interleaver applied to HE PPDU OFDM symbols supporting MU-MIMO or OFDMA according to the present invention.

$N_{CBPS}$ is the number of coded blocks per symbol.
$N_{SS}$ is the number of spatial streams.
$N_{CBPSS}$ is the number of coded bits per symbol per spatial stream.
$N_{CBPSSI}$ is the number of coded bits per symbol per spatial stream per interleaver block.
$N_{ROW}$ is the number of rows in a block interleaver.
$N_{COL}$ is the number of columns in the block interleaver.
$N_{SD}$ is the number of complex data per frequency segment.

$N_{ROT}$ is a parameter for frequency rotation.

$N_{BPSCS}$ is the number of coded bits per subcarrier per spatial stream.

Herein, a frequency segment may correspond to a subchannel, a suband, or a resource unit, as described in the present disclosure. While the following description is given mainly in the context of subchannel, the term subchannel may be replaced with subband, resource unit, or frequency segment.

While the following description is given on the assumption that one channel has a channel bandwidth of 20 MHz and uses 256-FFT and X subchannels of the channel have the same bandwidth (i.e., each subchannel has a bandwidth of 20/X MHz and uses 256/X FFT), this is purely exemplary, not limiting the scope of the present invention.

A Case with X=4

A description is given below of an embodiment of configurations of data, pilots, and guard subcarriers in regard to 64 subcarriers corresponding to one subchannel and an interleaver for data subcarriers according to the present invention, when PSDU transmission is performed independently on four subchannels of one channel.

In a 5-MHz HE PPDU transmission on one subchannel, bits output from a stream parser may be processed on a group basis and each group includes $N_{CBPS}$ bits. Each group may be divided into $N_{SS}$ blocks ($N_{SS}$ may be set to separate values for subchannels, and values of $N_{SS}$ may be equal or different in subchannels) each including $N_{CBPSS}$ bits. Each block may be interleaved in the following manner.

An interleaver may be configured to perform frequency interleaving. The stream parser may output blocks each including $N_{CBPSSI}$ bits. Each block may be interleaved by writing the block by rows and reading out the block by columns (i.e., $N_{CBPSSI}$ bits are written row by row in a block interleaver (i.e., if all elements of one row are filled with bits, the next row is taken) and read out column by column in the block interleaver (i.e., if all elements of one column are read out, the next column is taken)). The depth of the interleaver, that is, the number of columns, $N_{COL}$ may be selected in such a manner that the capability of error recovery may be optimized when a specific bandwidth and frequency are used.

In the embodiment of the present invention, 5-MHz OFDM-MIMO transmission may be used. 64 orthogonal subcarriers are available within 5 MHz. In one aspect, 52 or more subcarriers (i.e., tones) out of the 64 available subcarriers may be used for data transmission, and the remaining tones may be used as pilot tones, a DC tone, and guard tones. In this manner, the value of $N_{COL}$ corresponding to the interleaver depth may be optimized for 52 or more data tones according to various implementation schemes. For example, the interleaver depth, $N_{COL}$ may be selected, which is a factor of the number of data tones (i.e. 52 or larger). The interleaver depth $N_{COL}$ may be selected, which enables a receiver to recover a message on the 52 or more data tones with a highest frequency diversity.

[Table 3] below lists exemplary interleaver depths $N_{COL}$ and numbers of rows $N_{ROW}$ as exemplary parameters of the present invention.

TABLE 3

| Parameter | Option 1 | Option 2 | Option 3 | Option 4 | Option 5 | Option 6 |
|---|---|---|---|---|---|---|
| $N_{SD}$ | 52 | 54 | 55 | 56 | 56 | 57 |
| $N_{COL}$ | 13 | 9 | 11 | 8 | 14 | 19 |
| $N_{ROW}$ | $4 \times N_{BPSCS}(i_{ss})$ | $6 \times N_{BPSCS}(i_{ss})$ | $5 \times N_{BPSCS}(i_{ss})$ | $7 \times N_{BPSCS}(i_{ss})$ | $4 \times N_{BPSCS}(i_{ss})$ | $3 \times N_{BPSCS}(i_{ss})$ |
| $N_{ROT}$ ($N_{ss} <= 4$) | 11 | 11 | 11 | 11 | 11 | 11 |
| $N_{ROT}$ ($N_{ss} > 4$) | 6 | 6 | 6 | 6 | 6 | 6 |
| Parameter | Option 7 | Option 8 | Option 9 | Option 10 | Option 11 | Option 12 |
| $N_{SD}$ | 58 | 60 | 60 | 60 | 60 | 60 |
| $N_{COL}$ | 29 | 30 | 20 | 15 | 12 | 10 |
| $N_{ROW}$ | $2 \times N_{BPSCS}(i_{ss})$ | $2 \times N_{BPSCS}(i_{ss})$ | $3 \times N_{BPSCS}(i_{ss})$ | $4 \times N_{BPSCS}(i_{ss})$ | $5 \times N_{BPSCS}(i_{ss})$ | $6 \times N_{BPSCS}(i_{ss})$ |
| $N_{ROT}$ ($N_{ss} <= 4$) | 11 | 11 | 11 | 11 | 11 | 11 |
| $N_{ROT}$ ($N_{ss} > 4$) | 6 | 6 | 6 | 6 | 6 | 6 |
| Parameter | Option 13 | Option 14 | Option 15 | Option 16 | Option 17 | Option 18 |
| $N_{SD}$ | 62 | 48 | 48 | 48 | 48 | 48 |
| $N_{COL}$ | 31 | 16 | 16 | 16 | 16 | 16 |
| $N_{ROW}$ | $2 \times N_{BPSCS}(i_{ss})$ | $3 \times N_{BPSCS}(i_{ss})$ | $3 \times N_{BPSCS}(i_{ss})$ | $3 \times N_{BPSCS}(i_{ss})$ | $3 \times N_{BPSCS}(i_{ss})$ | $3 \times N_{BPSCS}(i_{ss})$ |
| $N_{ROT}$ ($N_{ss} <= 4$) | 11 | 10 | 11 | 12 | 13 | 14 |
| $N_{ROT}$ ($N_{ss} > 4$) | 6 | 4, 5, 6, 7, or 8 | 4, 5, 6, 7, or 8 | 4, 5, 6, 7, or 8 | 4, 5, 6, 7, or 8 | 4, 5, 6, 7, or 8 |

Although Option 2, Option 5, and Option 10 are preferred among the candidate options listed in [Table 3], other options may also be used as alternatives in consideration of implementation complexity or a propagation property.

According to the present invention, interleaving may be defined by three permutations.

The first permutation of the interleaver may be expressed as the following [Equation 1].

$$i = N_{ROW}(k \bmod N_{COL}) + \left\lfloor \frac{k}{N_{COL}} \right\rfloor, \quad \text{[Equation 1]}$$

$$k = 0, 1, \ldots, N_{CBPSSI} - 1$$

In [Equation 1], k is the index of a coded bit before the first permutation, and i is the index of the coded bit after the first permutation before the second permutation. In addition, mod represents a modulo operation of calculating the remainder of dividing A by B. $\lfloor\ \rfloor$ is a floor operation and $\lfloor x \rfloor$ represents a largest integer that does not exceed x (i.e., a largest integer equal to or less than x).

The second permutation of the interleaver is given by the following [Equation 2].

$$j = s\left\lfloor\frac{i}{s}\right\rfloor + \left(i + N_{CBPSSI} - \left\lfloor\frac{N_{COL} \cdot i}{N_{CBPSSI}}\right\rfloor\right)\text{mod}\,s, \quad \text{[Equation 2]}$$
$$i = 0, 1, \ldots, N_{CBPSSI} - 1$$
$$s = \max\left\{1, \frac{N_{BPSCS}}{2}\right\}$$

In [Equation 2], j is the index of the coded bit after the second permutation, s is the number of bits allocated to a constellation point of a spatial stream on one axis (i.e., a real number axis or an imaginary number axis), and max {A,B} represents the larger between A and B.

Frequency rotation may be applied of the output of the second permutation (i.e., j). The frequency rotation may be referred to as the third permutation of the interleaver. After the third permutation, the coded bit may be indexed with r.

If $N_{SS}=1$, $r=j$.

If $2 \le N_{SS} \le 4$, the output of the second permutation may be subjected to frequency rotation given by [Equation 3]

$$r = \left\{j - \left[(2(i_{SS}-1))\text{mod}3 + 3\left\lfloor\frac{i_{SS}-1}{3}\right\rfloor\right] \cdot N_{ROT} \cdot N_{BPSCS}\right\} \quad \text{[Equation 3]}$$
$$\text{mod}\,N_{CBPSSI},$$
$$j = 0, 1, \ldots, N_{CBPSSI} - 1$$
$$i_{SS} = 1, 2, \ldots, N_{SS}$$

In [Equation 3], $i_{SS}$ is the index of a spatial stream on which the interleaver operates.

If $N_{SS}>4$, frequency rotation described by [Equation 4] may be performed on the output of the second permutation.

$$r = \{j - J(i_{SS}) \cdot N_{ROT} \cdot N_{BPSCS}\}\ \text{mod}\ N_{CBPSSI},\ j=0,$$
$$1, \ldots, N_{CBPSSI}-1\ i_{SS}=1, 2, \ldots, N_{SS} \quad \text{[Equation 4]}$$

In [Equation 4], $J(i_{SS})$ is an integer defined in [Table 4].

TABLE 4

| $i_{ss}$ | $J(i_{ss})$ |
|---|---|
| 1 | 0 |
| 2 | 5 |
| 3 | 2 |
| 4 | 7 |
| 5 | 3 |
| 6 | 6 |
| 7 | 1 |
| 8 | 4 |

Meanwhile, a deinterleaver performs inverse permutation by the following three operations. The characteristics (or parameters) of the interleaver may be applied as the characteristics (or parameters) of the deinterleaver. To describe a deinterleaving operation, it is assumed that the index of a bit of a received block (per spatial stream) is r.

The first operation of the deinterleaver corresponds to the reverse operation of the third permutation (i.e., frequency rotation) performed in the interleaver.

If $N_{SS}=1$, the reverse operation may be performed as described by [Equation 5].

$$j=r\ (r=0, 1, \ldots, N_{CBPSSI}-1) \quad \text{[Equation 5]}$$

If $2 \le N_{SS} \le 4$, the reverse operation may be performed as described by [Equation 6].

$$j = \left\{r + \left[(2(i_{SS}-1))\text{mod}3 + 3\left\lfloor\frac{i_{SS}-1}{3}\right\rfloor\right] \cdot N_{ROT} \cdot N_{BPSCS}\right\} \quad \text{[Equation 6]}$$
$$\text{mod}\,N_{CBPSSI},$$
$$r = 0, 1, \ldots, N_{CBPSSI} - 1$$

If $N_{SS}>4$, the reverse operation may be performed as described by [Equation 7].

$$j=\{r+J(i_{SS}) \cdot N_{ROT} \cdot N_{BPSCS}\}\ \text{mod}\ N_{CBPSSI},\ r=0,$$
$$1, \ldots, N_{CBPSSI}-1 \quad \text{[Equation 7]}$$

In [Equation 7], $J(i_{SS})$ is an integer as defined in [Table 4].

In this manner, the output of the first operation in the deinterleaver may be indexed with j.

The second operation of the deinterleaver may be expressed as [Equation 8].

$$i = s\left\lfloor\frac{j}{s}\right\rfloor + \left(j + \left\lfloor\frac{N_{COL} \cdot j}{N_{CBPSSI}}\right\rfloor\right)\text{mod}\,s, \quad \text{[Equation 8]}$$
$$j = 0, 1, \ldots, N_{CBPSSI} - 1$$
$$s = \max\left\{1, \frac{N_{BPSCS}}{2}\right\}$$

The output of the second operation in the deinterleaver may be indexed with i in this manner.

The third operation of the deinterleaver may be expressed as [Equation 9].

$$k = N_{COL} \cdot i - (N_{CBPSSI} - 1)\left\lfloor\frac{i}{N_{ROW}}\right\rfloor, \quad \text{[Equation 9]}$$
$$i = 0, 1, \ldots, N_{CBPSSI} - 1$$

The output of the third operation in the deinterleaver may be indexed with k in this manner, corresponding to the index k of the coded bit before the first permutation in the interleaver.

A Case with X=8

A description is given below of an embodiment of configurations of data, pilots, and guard subcarriers in regard to 32 subcarriers corresponding to one subchannel and an interleaver for data subcarriers according to the present invention, when PSDU transmission is performed independently on eight subchannels of one channel.

In a 2.5-MHz HE PPDU transmission on one subchannel, bits output from the stream parser may be processed on a group basis and each group includes $N_{CBPS}$ bits. Each group may be divided into $N_{SS}$ blocks ($N_{SS}$ may be set to separate values for subchannels, and values of $N_{SS}$ may be equal or different in subchannels) each including $N_{CBPSS}$ bits. Each block may be interleaved in the following manner.

The interleaver may be configured to perform frequency interleaving. The stream parser may output blocks each including $N_{CBPSSI}$ bits. Each block may be interleaved by writing the block row by row and reading out the block column by column. The depth of the interleaver, that is, the number of columns, $N_{COL}$ may be selected in such a manner that the capability of error recovery may be optimized when a specific bandwidth and frequency are used.

In the embodiment of the present invention, 2.5-MHz OFDM-MIMO transmission may be used. 32 orthogonal subcarriers are available within 2.5 MHz. In one aspect, 24 or more subcarriers (i.e., tones) out of the 32 available subcarriers may be used for data transmission, and the remaining tones may be used as pilot tones, a DC tone, and guard tones. In this manner, the value of $N_{COL}$ corresponding to the interleaver depth may be optimized for 24 or more data tones according to various implementation schemes. For example, the interleaver depth, $N_{COL}$ may be selected, which is a factor of the number of data tones (i.e. 24 or larger). The interleaver depth $N_{COL}$ may be selected, which enables a receiver to recover a message on the 24 or more data tones with a highest frequency diversity.

[Table 5] below lists exemplary interleaver depths $N_{COL}$ and numbers of rows $N_{ROW}$ as exemplary parameters of the present invention.

Figure 13:
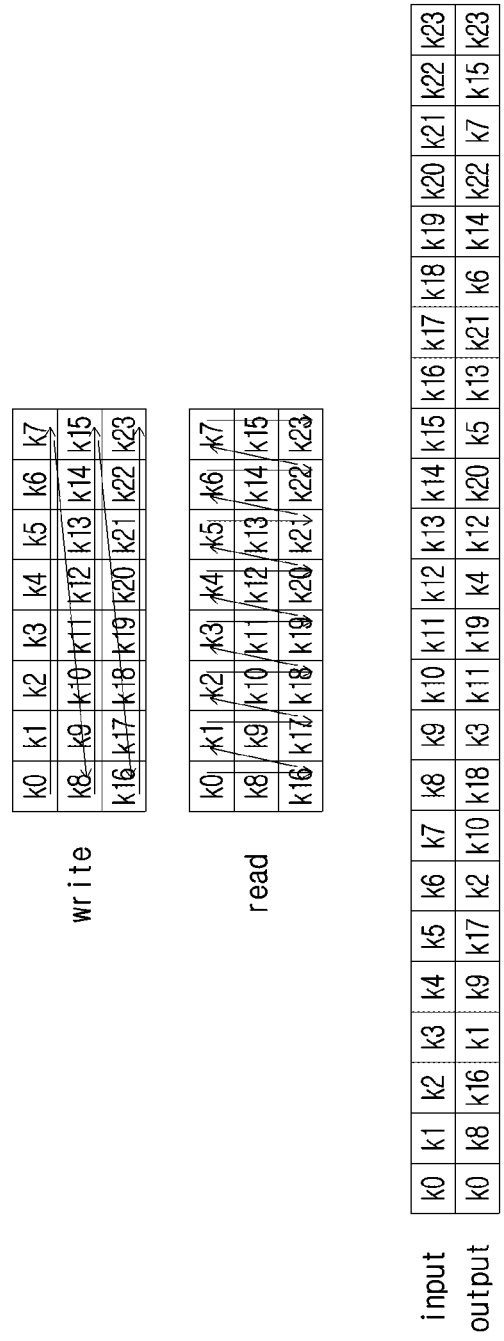
FIG. 13 depicts exemplary interleaving of a HE PPDU OFDM symbol according to the present invention.

Under the above assumption, the block interleaver illustrated in FIG. 13 may perform the first interleaving on $N_{CBPSSI}$ bits output from the stream parser. For example, index i corresponding to index k may be achieved as listed in [Table 6] below on the assumption that $N_{CBPSSI}$=24, $N_{ROW}$=3, and $N_{COL}$=8 in [Equation 1].

TABLE 6

| k | 0 | 1 | 2 | 3 | 4 | 5 | 6 | 7 | 8 | 9 | 10 | 11 |
|---|---|---|---|---|---|---|---|---|---|---|----|----|
| i | 0 | 3 | 6 | 9 | 12 | 15 | 18 | 21 | 1 | 4 | 7 | 10 |
| k | 12 | 13 | 14 | 15 | 16 | 17 | 18 | 19 | 20 | 21 | 22 | 23 |
| i | 13 | 16 | 19 | 22 | 2 | 5 | 8 | 11 | 14 | 17 | 20 | 23 |

The value of j resulting from the second interleaving of the value of i calculated by [Equation 1] may be calculated by [Equation 2]. In [Equation 2], $N_{BPSCS}$ is 1 in the case of BPSK. Accordingly, index j corresponding to index i may be obtained as listed in [Table 7].

TABLE 5

| Parameter | Option 1 | Option 2 | Option 3 | Option 4 | Option 5 | Option 6 |
|---|---|---|---|---|---|---|
| $N_{SD}$ | 24 | 25 | 26 | 27 | 28 | 28 |
| $N_{COL}$ | 8 | 5 | 13 | 9 | 7 | 14 |
| $N_{ROW}$ | 3 × $N_{BPSCS}$ ($i_{ss}$) | 5 × $N_{BPSCS}$ ($i_{ss}$) | 2 × $N_{BPSCS}$ ($i_{ss}$) | 3 × $N_{BPSCS}$ ($i_{ss}$) | 4 × $N_{BPSCS}$ ($i_{ss}$) | 2 × $N_{BPSCS}$ ($i_{ss}$) |
| $N_{ROT}$ ($N_{ss}$ <= 4) | 4 or 5 | 4 or 5 | 4 or 5 | 4 or 5 | 4 or 5 | 4 or 5 |
| $N_{ROT}$ ($N_{ss}$ > 4) | 2 | 2 | 2 | 2 | 2 | 2 |

| Parameter | Option 7 | Option 8 | Option 9 | Option 10 |
|---|---|---|---|---|
| $N_{SD}$ | 24 | 24 | 24 | 24 |
| $N_{COL}$ | 8 | 8 | 8 | 8 |
| $N_{ROW}$ | 3 × $N_{BPSCS}$ ($i_{ss}$) | 3 × $N_{BPSCS}$ ($i_{ss}$) | 3 × $N_{BPSCS}$ ($i_{ss}$) | 3 × $N_{BPSCS}$ ($i_{ss}$) |
| $N_{ROT}$ ($N_{ss}$ <= 4) | 5 | 6 | 7 | 8 |
| $N_{ROT}$ ($N_{ss}$ > 4) | 3 or 4 | 2, 3, or 4 | 2, 3, or 4 | 2, 3, or 4 |

Although Option 3, Option 5, and Option 6 are preferred among the candidate options listed in [Table 5], other options may also be used as alternatives in consideration of implementation complexity or a propagation property. A transmitter may perform interleaving by [Equation 1] to [Equation 4] and a receiver may deinterleave a received interleaved signal by [Equation 5] to [Equation 9], based on the parameter values of one of the candidate options listed in [Table 5].

FIG. 13 depicts exemplary interleaving of a HE PPDU OFDM symbol according to the present invention.

For example, $N_{SD}$=24 in Option 1 of [Table 5] means that 24 out of 32 available subcarriers are used for complex data. Therefore, the remaining eight subcarriers may be used as pilot tones, a DC tone, and guard tones. For example, there may be two pilot tones. In this case, a resource unit has 26 tones with two pilots.

$N_{BPSCS}(i_{SS})$ may be determined according to an MCS and may be 1, 2, 4, 6, and 8, respectively for Binary Phase Shift Keying (BPSK), Quadrature PSK (QPSK), 16-ary Quadrature Amplitude Modulation (16 QAM), 64 QAM, and 256 QAM. If BPSK is used, $N_{BPSCS}(i_{SS})$ is 1. Then the number of rows in the block interleaver is 3 ($N_{ROW}$=3×1). Therefore, the block interleaver may have 8 columns ($N_{COL}$=8) and 3 rows. If the number of spatial streams, $N_{SS}$ is 1, $N_{ROT}$ may be, for example, 4.

TABLE 7

| i | 0 | 1 | 2 | 3 | 4 | 5 | 6 | 7 | 8 | 9 | 10 | 11 |
|---|---|---|---|---|---|---|---|---|---|---|----|----|
| j | 0 | 1 | 2 | 3 | 4 | 5 | 6 | 7 | 8 | 9 | 10 | 11 |
| i | 12 | 13 | 14 | 15 | 16 | 17 | 18 | 19 | 20 | 21 | 22 | 23 |
| j | 12 | 13 | 14 | 15 | 16 | 17 | 18 | 19 | 20 | 21 | 22 | 23 |

The value of r resulting from the third interleaving (permutation) of the value of j calculated by [Equation 2] may be calculated by [Equation 3]. For $N_{ROT}$=4 and $i_{ss}$=1 In [Equation 3], index r corresponding to index j may be obtained as listed in [Table 8].

TABLE 8

| j | 0 | 1 | 2 | 3 | 4 | 5 | 6 | 7 | 8 | 9 | 10 | 11 |
|---|---|---|---|---|---|---|---|---|---|---|----|----|
| r | 0 | 1 | 2 | 3 | 4 | 5 | 6 | 7 | 8 | 9 | 10 | 11 |
| j | 12 | 13 | 14 | 15 | 16 | 17 | 18 | 19 | 20 | 21 | 22 | 23 |
| r | 12 | 13 | 14 | 15 | 16 | 17 | 18 | 19 | 20 | 21 | 22 | 23 |

Referring to [Table 6], [Table 7], and [Table 8], for example, a k value of 17 is mapped to an i value of 5, the i value of 5 is mapped to a j value of 5, and the j value of 5 is mapped to an r value of 5. Eventually, the k value of 17 is mapped to the r value of 5. An $18^{th}$ input bit (i.e., k17) is output as $6^{th}$ output bit by sequence permutation in FIG. 1.

A Case with X=16

A description is given below of an embodiment of configurations of data, pilots, and guard subcarriers in regard to 16 subcarriers corresponding to one subchannel and an interleaver for data subcarriers according to the present invention, when PSDU transmission is performed independently on 16 subchannels of one channel.

In a 1.25-MHz HE PPDU transmission on one subchannel, bits output from the stream parser may be processed on a group basis and each group includes $N_{CBPS}$ bits. Each group may be divided into $N_{SS}$ blocks ($N_{SS}$ may be set to separate values for subchannels, and values of $N_{SS}$ may be equal or different in subchannels) each including $N_{CBPSS}$ bits. Each block may be interleaved in the following manner.

The interleaver may be configured to perform frequency interleaving. The stream parser may output blocks each including $N_{CBPSSI}$ bits. Each block may be interleaved by writing the block row by row and reading out the block column by column. The depth of the interleaver, that is, the number of columns, $N_{COL}$ may be selected in such a manner that the capability of error recovery may be optimized when a specific bandwidth and frequency are used.

In the embodiment of the present invention, 1.25-MHz OFDM-MIMO transmission may be used. 16 orthogonal subcarriers are available within 1.25 MHz. In one aspect, 10 or more subcarriers (i.e., tones) out of the 16 available subcarriers may be used for data transmission, and the remaining tones may be used as pilot tones, a DC tone, and guard tones. In this manner, the value of $N_{COL}$ corresponding to the interleaver depth may be optimized for 10 or more data tones according to various implementation schemes. For example, the interleaver depth, $N_{COL}$ may be selected, which is a factor of the number of data tones (i.e. 10 or larger). The interleaver depth $N_{COL}$ may be selected, which enables a receiver to recover a message on the 10 or more data tones with a highest frequency diversity.

[Table 9] below lists exemplary interleaver depths $N_{COL}$ and numbers of rows $N_{ROW}$ as exemplary parameters of the present invention.

TABLE 9

| Parameter | Option 1 | Option 2 | Option 3 |
|---|---|---|---|
| $N_{SD}$ | 10 | 12 | 12 |
| $N_{COL}$ | 5 | 4 | 6 |
| $N_{ROW}$ | $2 \times N_{BPSCS}(i_{ss})$ | $3 \times N_{BPSCS}(i_{ss})$ | $2 \times N_{BPSCS}(i_{ss})$ |
| $N_{ROT}$ ($N_{ss} <= 4$) | 2 or 3 | 2 or 3 | 2 or 3 |
| $N_{ROT}$ ($N_{ss} > 4$) | 1 | 1 | 1 |

Although Option 2 and Option 3 are preferred among the candidate options listed in [Table 9], other options may also be used as alternatives in consideration of implementation complexity or a propagation property. A transmitter may perform interleaving by [Equation 1] to [Equation 4] and a receiver may deinterleave a received interleaved signal by [Equation 5] to [Equation 9], based on the parameter values of one of the candidate options listed in [Table 9].

A Case with X=1

A description is given below of an embodiment of configurations of data, pilots, and guard subcarriers in regard to 256 subcarriers corresponding to one subchannel and an interleaver for data subcarriers according to the present invention, when PSDU transmission is performed independently on one subchannel of one channel.

In a 20-MHz HE PPDU transmission on one subchannel, bits output from the stream parser may be processed on a group basis and each group includes $N_{CBPS}$ bits. Each group may be divided into $N_{SS}$ blocks ($N_{SS}$ may be set to separate values for subchannels, and values of $N_{SS}$ may be equal or different in subchannels) each including $N_{CBPSS}$ bits. Each block may be interleaved in the following manner.

The interleaver may be configured to perform frequency interleaving. The stream parser may output blocks each including $N_{CBPSSI}$ bits. Each block may be interleaved by writing the block row by row and reading out the block column by column. The depth of the interleaver, that is, the number of columns, $N_{COL}$ may be selected in such a manner that the capability of error recovery may be optimized when a specific bandwidth and frequency are used.

In the embodiment of the present invention, 20-MHz OFDM-MIMO transmission may be used. 256 orthogonal subcarriers are available within 20 MHz. In one aspect, 234 or more subcarriers (i.e., tones) out of the 256 available subcarriers may be used for data transmission, and the remaining tones may be used as pilot tones, a DC tone, and guard tones. In this manner, the value of $N_{COL}$ corresponding to the interleaver depth may be optimized for 234 or more data tones according to various implementation schemes. For example, the interleaver depth, $N_{COL}$ may be selected, which is a factor of the number of data tones (i.e. 234 or larger). The interleaver depth $N_{COL}$ may be selected, which enables a receiver to recover a message on the 234 or more data tones with a highest frequency diversity.

[Table 10] below lists exemplary interleaver depths $N_{COL}$ and numbers of rows $N_{ROW}$ as exemplary parameters of the present invention.

TABLE 10

| Parameter | |
|---|---|
| $N_{SD}$ | 234 |
| $N_{COL}$ | 26 |
| $N_{ROW}$ | $9 \times N_{BPSCS}(i_{ss})$ |
| $N_{ROT}$ ($N_{ss} <= 4$) | 58 |
| $N_{ROT}$ ($N_{ss} > 4$) | 28 |

A transmitter may perform interleaving by [Equation 1] to [Equation 4] and a receiver may deinterleave a received interleaved signal by [Equation 5] to [Equation 9], based on the parameter values of one of the candidate option in [Table 10].

A Case with X=2

A description is given below of an embodiment of configurations of data, pilots, and guard subcarriers in regard to 128 subcarriers corresponding to one subchannel and an interleaver for data subcarriers according to the present invention, when PSDU transmission is performed independently on two subchannels of one channel.

In a 10-MHz HE PPDU transmission on one subchannel, bits output from the stream parser may be processed on a group basis and each group includes $N_{CBPS}$ bits. Each group may be divided into $N_{SS}$ blocks ($N_{SS}$ may be set to separate values for subchannels, and values of $N_{SS}$ may be equal or different in subchannels) each including $N_{CBPSS}$ bits. Each block may be interleaved in the following manner.

The interleaver may be configured to perform frequency interleaving. The stream parser may output blocks each including $N_{CBPSSI}$ bits. Each block may be interleaved by writing the block row by row and reading out the block column by column. The depth of the interleaver, that is, the number of columns, $N_{COL}$ may be selected in such a manner that the capability of error recovery may be optimized when a specific bandwidth and frequency are used.

In the embodiment of the present invention, 10-MHz OFDM-MIMO transmission may be used. 128 orthogonal subcarriers are available within 10 MHz. In one aspect, 102 or more subcarriers (i.e., tones) out of the 128 available subcarriers may be used for data transmission, and the remaining tones may be used as pilot tones, a DC tone, and guard tones. In this manner, the value of $N_{COL}$ corresponding to the interleaver depth may be optimized for 102 or more data tones according to various implementation schemes. For example, the interleaver depth, $N_{COL}$ may be selected, which is a factor of the number of data tones (i.e. 102 or larger). The interleaver depth $N_{COL}$ may be selected, which enables a receiver to recover a message on the 102 or more data tones with a highest frequency diversity.

[Table 11] below lists exemplary interleaver depths $N_{COL}$ and numbers of rows $N_{ROW}$ as exemplary parameters of the present invention.

TABLE 11

| Parameter | |
|---|---|
| $N_{SD}$ | 102 |
| $N_{COL}$ | 17 |
| $N_{ROW}$ | 6 × $N_{BPSCS}$ ($i_{ss}$) |
| $N_{ROT}$ ($N_{ss}$ <= 4) | 23, 24, 25, 26, or 27 |
| $N_{ROT}$ ($N_{ss}$ > 4) | 10, 11, 12, 13, or 14 |

A transmitter may perform interleaving by [Equation 1] to [Equation 4] and a receiver may deinterleave a received interleaved signal by [Equation 5] to [Equation 9], based on one of the parameters of the candidate option listed in [Table 11].

While the foregoing examples have been described on the assumption that one channel has a channel bandwidth of 20 MHz and uses 256-FFT and X subchannels of one channel have the same bandwidth, the channel bandwidth of one channel may not be limited to 20 MHz and the subchannels may have different bandwidths. For example, a subchannel may have one of 1.25 MHz, 2.5 MHz, 5 MHz, 10 MHz, 20 MHz, 40 MHz, and 80 MHz. For example, a plurality of subchannels allocated within one transmission channel (e.g., having a 20-MHz channel bandwidth) may have a first bandwidth (narrower than the bandwidth of the transmission channel), a second bandwidth (narrower than the first bandwidth), and a third bandwidth (narrower than the second bandwidth).

For example, if subchannels are allocated to 4 STAs using 256-FFT on a channel having a channel bandwidth of 20 MHz (i.e., if an AP transmits a DL PSDU to each of four STAs on a subchannel allocated to the STA or each of four STAs transmits a UL PSDU to the AP on a subchannel allocated to the STA), the subchannels allocated to the four respective STAs may have different bandwidths, for example, 2.5 MHz, 2.5 MHz, 5 MHz, ad 10 MHz. In this manner, a PSDU may be transmitted on a subchannel having a different bandwidth in a HE PPDU. To support this, different interleaver depths $N_{COL}$ and different values of $N_{ROW}$ (or interleavers may be used independently) may be used for PSDUs on the respective channels.

For example, an interleaver defined according to the parameter characteristics of Option 1 in [Table 5] may be used for a PSDU transmitted on a 2.5-MHz subchannel and an interleaver defined according to the parameter characteristics listed in [Table 11] may be used for a PSDU transmitted on a 10-MHz subchannel in the example of the present invention.

According to the present invention, different interleaver characteristics may be applied to different subchannels on which a plurality of PSDUs are transmitted simultaneously (or to different PSDUs), as described above. Particularly, if different subchannels carrying different PSDUS at the same time have different bandwidths, interleavers defined for transmission or reception of PSDUs on the subchannels may have different characteristics. That is, independent interleaving for each subchannel means that a first interleaver may be used for a first subchannel, a second interleaver may be used for a second subchannel, the first and second subchannels may be different, and the first and second interleavers may be same or different. If the first and second subchannels have the same bandwidth, the first and second interleavers may have the same characteristics (or the same parameters (e.g., the first and second interleavers may have the same interleaver depth $N_{COL}$ and the same value of $N_{ROW}$). If the first and second subchannels have different bandwidths, the first and second interleavers may have different characteristics (or different parameters (e.g., the first and second interleavers may have different interleaver depths $N_{COL}$ and different values of $N_{ROW}$).

In a DL MU-MIMO or OFDMA transmission based on a HE PPDU frame format, subchannels carrying PSDUs to a plurality of STAs may have different bandwidths, and interleaver characteristics (e.g., combinations of parameters related to interleaving schemes) that the AP applies to the PSDUs (or PSDU OFDM symbols) on the respective subchannels may be determined the characteristics of the subchannels (e.g., the bandwidths or sizes of the subchannels or $N_{SD}$ values of the subchannels (i.e., the numbers of complex data per frequency segment (or subchannel)). Upon receipt of this DL MU-MIMO or OFDMA data, each STA may deinterleave the received data in an interleaver scheme determined according to the characteristics of a subchannel allocated to the STA.

In a UL MU-MIMO or OFDMA transmission based on a HE PPDU frame format, subchannels carrying PSDUs from a plurality of STAs may have different bandwidths, and interleaver characteristics (e.g., combinations of parameters related to interleaving schemes) that each STA applies to a PSDU (or PSDU OFDM symbols) on a subchannel allocated to the STA may be determined the characteristics of the subchannel (e.g., the bandwidth or size of the subchannel, or an $N_{SD}$ value of the subchannel (i.e., the number of complex data per frequency segment)). Upon receipt of this UL MU-MIMO or OFDMA data, the AP may deinterleave the received data in an interleaver scheme determined according to the characteristics of the subchannel carrying a PSDU from each STA.

Figure 14:
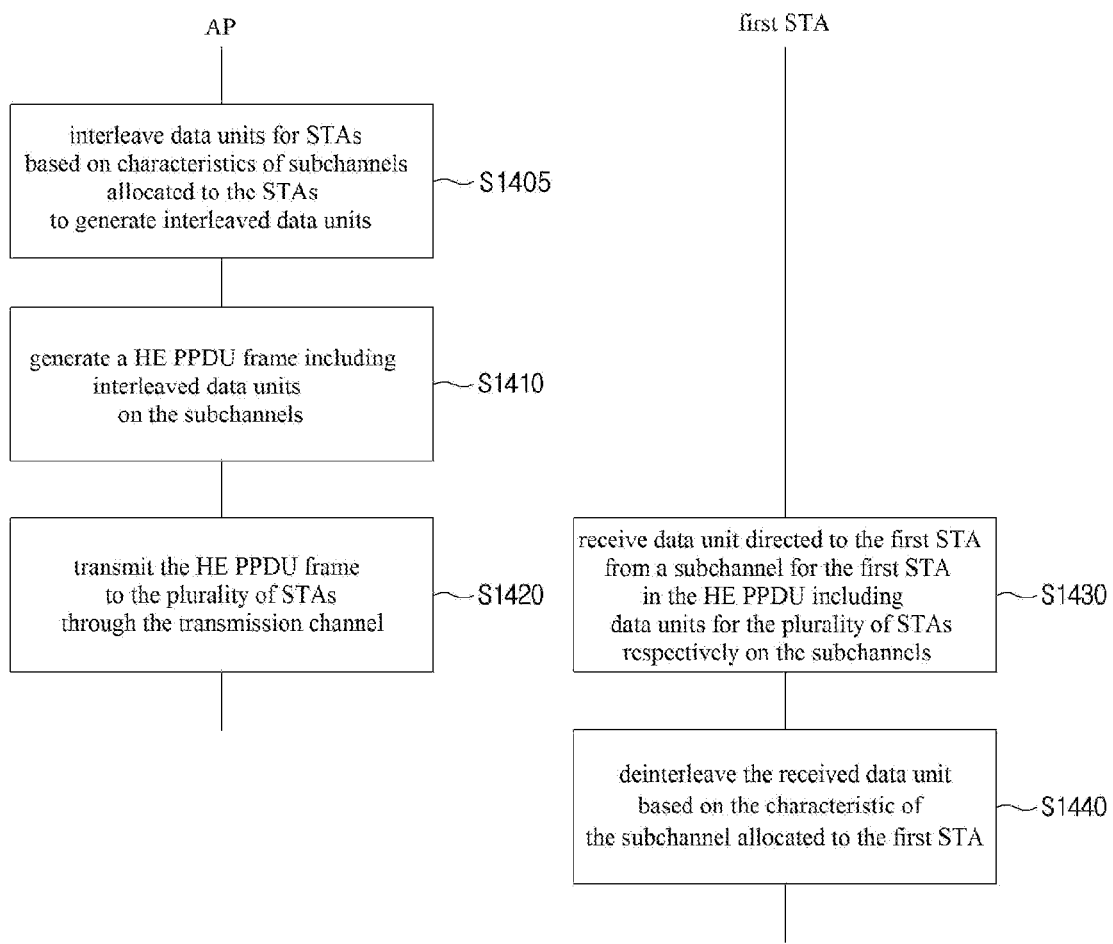
FIG. 14 is a flowchart illustrating an exemplary method according to the present invention.

FIG. 14 is a flowchart illustrating an exemplary method according to the present invention.

In FIG. 14, AP may transmit a PPDU to a plurality of STAs through a transmission channel, the PPDU including a plurality of data units for the plurality of STAs, the transmission channel being divided into a plurality of subchannels which are allocated to the plurality of STAs respectively. The plurality of subchannels may correspond to a plurality of OFDMA RUs. The transmission channel may be a 20 MHz channel, a 40 MHz channel, a 80 MHz channel, or a 160 MHz channel.

In step S1405, an AP may interleave data units for STAs based on characteristics of subchannels allocated to the STAs to generate interleaved data units. The AP may interleave the plurality of data units based on a plurality of subchannel sizes respectively corresponding to the plurality of subchannels. The AP may interleave the plurality of data units based on a plurality of interleaving parameter value combinations respectively depending on the plurality of subchannel sizes.

[Table 12] below lists below lists exemplary interleaving parameter value combinations depending on subchannel sizes.

TABLE 12

| RU size (tones) | 26 | 52 | 106 | 242 |
|---|---|---|---|---|
| $N_{COL}$ | 8 | 16 | 17 | 26 |
| $N_{ROT}$ | 2 ($N_{ss} \leq 4$) | 11 ($N_{ss} \leq 4$) | 29 ($N_{ss} \leq 4$) | 58 ($N_{ss} \leq 4$) |

In [Table 12], a subchannel size is expressed as an RU size, and the RU size is expressed as a number of tone allocated to the RU. The number of tones includes a number of data tones and a number of pilot tones.

As shown in [Table 12], for a subchannel size corresponding to 26 tones, an interleaving parameter value combination of $N_{COL}=8$ and $N_{ROT}=2$ ($N_{SS} \leq 4$) may be used. For a subchannel size corresponding to 52 tones, an interleaving parameter value combination of $N_{COL}=16$ and $N_{ROT}=11$ ($N_{SS} \leq 4$) may be used. For a subchannel size corresponding to 106 tones, an interleaving parameter value combination of $N_{COL}=17$ and $N_{ROT}=29$ ($N_{SS} \leq 4$) may be used. For a subchannel size corresponding to 242 tones, an interleaving parameter value combination of $N_{COL}=26$ and $N_{ROT}=58$ ($N_{SS} \leq 4$) may be used.

As described above, when a first subchannel size differs from a second subchannel size, an interleaving parameter value combination for the first subchannel size differs from an interleaving parameter value combination for the second subchannel size. Specifically, when a first subchannel size differs from a second subchannel size, $N_{COL}$ for the first subchannel size differs from $N_{COL}$ for the second subchannel, and $N_{ROT}$ for the first subchannel differs from $N_{ROT}$ for the first subchannel.

A subchannel size for a STA may be 26 tones, 52 tones, 106 tones, or 242 tones, and an interleaving parameter value combination for 26 tones, an interleaving parameter value combination for 52 tones, an interleaving parameter value combination for 106 tones and an interleaving parameter value combination 242 tones differ from one another.

In step S1410, the AP may generate a HE PPDU frame including interleaved data units (e.g., PSDUs) to be transmitted to a plurality of STAs on the subchannels. Data for the plurality of STAs may be transmitted on different subchannels, and different interleavers may be applied to the data on the respective subchannels (e.g., a first interleaver may be applied to a first subchannel and second interleaver may be applied to a second subchannel).

In step S1420, the AP may transmit the HE PPDU frame to the plurality of STAs through the transmission channel.

In step S1430, a first STA may receive a data unit directed to the first STA from a subchannel for the first STA in the HE PPDU including data units for the plurality of STAs on the subchannels.

In step S1440, the first STA may deinterleave the received data unit based on the characteristic of the subchannel allocated to the first STA. The first STA deinterleaves the data unit for the first STA based on a subchannel size corresponding to the subchannel allocated to the first STA. The first STA deinterleaves the data unit for the first STA based on an interleaving parameter value combination depending on the subchannel size.

While an interleaver used for a DL HE PPDU by an AP and a deinterleaver used by an STA receiving the DL HE PPDU have been described in the example of FIG. 14, the scope of the present invention is not limited thereto. Rather, the present invention also includes an interleaver used for data transmitted on a subchannel allocated to each STA by the STA and a deinterleaver used for data received on each subchannel by an AP, in the case where a plurality of STAs transmit a HE PPDU including PSDUs transmitted from the STAs on a plurality of subchannels in UL MU-MIMO or OFDMA.

While the exemplary method has been described with reference to FIG. 14 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIG. 14.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting data to a plurality of Stations (STAs) through a transmission channel by an Access Point (AP) in a Wireless Local Area Network (WLAN) system, wherein the transmission channel is divided into a plurality of resource units which are allocated to the plurality of STAs respectively, the method comprising:
   interleaving a plurality of data units for the plurality of STAs based on sizes of the plurality of resource units allocated to the plurality of STAs to generate a plurality of interleaved data units; and
   transmitting, through the transmission channel, a Physical layer Protocol Data Unit (PPDU) frame including the plurality of interleaved data units respectively on the plurality of resource units to the plurality of STAs,
   wherein a set of sizes available to a resource unit allocated to a first STA among the plurality of STAs includes a first size and a second size,
   wherein the interleaving of the plurality of data units for the plurality of STAs comprises:
      when the size of the resource unit allocated to the first STA is the first size, interleaving a data unit for the first STA using a first set of interleaving parameter values; and when the size of the resource unit allocated to the first STA is the second size, interleaving the data unit for the first STA using a second set of interleaving parameter values, and wherein the first size is smaller than a size of the transmission channel, the second size is smaller than the first size, and the second set of interleaving parameter values is different from the first set of interleaving parameter value.

2. The method according to claim 1, wherein a size of each of the plurality of resource units corresponds to a number of tones allocated to said each of the plurality of resource units.

3. The method according to claim 2, wherein the number of tones allocated to said each of the plurality of resource units includes a number of tones used for complex data and a number of tones used for pilot in said each of the plurality of resource units.

4. The method according to claim 1, wherein the set of sizes available to the resource unit allocated to the first STA among the plurality of STAs further includes a third size, wherein the interleaving of the plurality of data units for the plurality of STAs further comprises:

when the size of the resource unit allocated to the first STA is the third size, interleaving the data unit for the first STA using a third set of interleaving parameter values, and wherein the third size is smaller than the second size, and the third set of interleaving parameter values is different from the second set of interleaving parameter values.

5. The method according to claim 1, wherein an interleaver depth for the first set of interleaving parameter values is different from an interleaver depth for the second set of interleaving parameter values.

6. The method according to claim 1, wherein each of the first set of interleaving parameter values and the second set of interleaving parameter values includes the number $N_{COL}$ of columns in a block interleaver, the number $N_{ROW}$ of rows in the block interleaver, and a frequency rotation parameter $N_{ROT}$.

7. The method according to claim 1, wherein the interleaving of the plurality of data units for the plurality of STAs comprises:

when the size of the resource unit allocated to the first STA is 24 data tones, interleaving the data unit for the first STA using a block interleaver having 8 columns.

8. The method according to claim 1, wherein:

when an index of a bit input for interleaving is k, an index i and an index j are calculated by the following equations, $$i = N_{ROW}(k \bmod N_{COL}) + \left\lfloor \frac{k}{N_{COL}} \right\rfloor, k = 0, 1, \ldots, N_{CBPSSI} - 1$$

$$j = s\left\lfloor \frac{i}{s} \right\rfloor + \left(i + N_{CBPSSI} - \left\lfloor \frac{N_{COL} \cdot i}{N_{CBPSSI}} \right\rfloor\right) \bmod s,$$

$$i = 0, 1, \ldots, N_{CBPSSI} - 1$$

$$s = \max\left\{1, \frac{N_{BPSCS}}{2}\right\}$$

i is an index obtained by applying a first permutation to the index k, j is an index obtained by applying a second permutation to the index i, when a number of spatial streams $N_{SS}$=is 1, an index r obtained by frequency rotation is calculated by r=j, and when 2≤$N_{SS}$≤4, the index r is calculated by $$r = \left\{ j - \left[(2(i_{SS} - 1)) \bmod 3 + 3\left\lfloor \frac{i_{SS} - 1}{3} \right\rfloor\right] \cdot N_{ROT} \cdot N_{BPSCS} \right\} \bmod N_{CBPSSI},$$

$$j = 0, 1, \ldots, N_{CBPSSI} - 1$$

$$i_{SS} = 1, 2, \ldots, N_{SS}$$

where:

mod represents a modulo operation,

⌊ ⌋ is a floor operation, $N_{COL}$ is a number of columns in a block interleaver, $N_{ROW}$ is a number of rows in the block interleaver, $N_{ROT}$ is a frequency rotation parameter, and $N_{CBPSSI}$ is the number of coded bits per symbol per spatial stream per interleaver block.

9. The method according to claim 8, wherein $N_{SS}$ is set to separate values for the plurality of resource units.

10. A method for receiving data from an Access Point (AP) through a transmission channel by a first Station (STA) among a plurality of STAs in a Wireless Local Area Network (WLAN) system, wherein the transmission channel is divided into a plurality of resource units which are allocated to the plurality of STAs respectively, the method comprising:

receiving, through the transmission channel, a Physical layer Protocol Data Unit (PPDU) frame including a plurality of data units for the plurality of STAs respectively on the plurality of resource units to acquire a data unit for the first STA from a resource units allocated to the first STA; and deinterleaving the data unit for the first STA based on a size corresponding to the resource unit allocated to the first STA, wherein a set of sizes available to the resource unit allocated to the first STA includes a first size and a second size, wherein the deinterleaving of the data unit for the STA comprises:

when the size of resource unit allocated to the first STA is the first size, deinterleaving the data unit for the first STA using a first set of interleaving parameter values; and when the size of resource unit allocated to the first STA is the second size, deinterleaving the data unit for the first STA using a second set of interleaving parameter values; and wherein the first size is smaller than a size of the transmission channel, the second size is smaller than the first size, and the second set of interleaving parameter values is different from the first set of interleaving parameter values.

11. The method according to claim 10, wherein the size of the resource unit corresponds to a number of tones allocated to the resource unit allocated to the first STA.

12. The method according to claim 10, wherein the set of sizes available to the resource unit allocated to the first STA further includes a third size, wherein the deinterleaving of the data unit for the first STA further comprises, when the size of the resource unit allocated to the first STA is the third size, deinterleaving the data unit for the first STA using a third set of interleaving parameter values, and wherein the third size is smaller than the second size, and the third set of interleaving parameter values is different from the second set of interleaving parameter values.

13. The method according to claim 10, wherein the size of the transmission channel is 20 MHz.

14. A method for receiving data from an Access Point (AP) through a transmission channel by a first Station (STA) among a plurality of STAs in a Wireless Local Area Network (WLAN) system, wherein the transmission channel is divided into a plurality of OFDMA resource units which are allocated to the plurality of STAs respectively, the method comprising:

receiving, through the transmission channel, a Physical layer Protocol Data Unit (PPDU) frame including a plurality of data units for the plurality of STAs respectively on the plurality of OFDMA resource units to acquire a data unit for the first STA from an OFDMA resource unit allocated to the first STA; and deinterleaving the data unit for the first STA based on a size of the OFDMA resource unit allocated to the first STA, wherein a set of sizes available to the OFDMA resource unit allocated to the first STA includes a first size and a second size, wherein deinterleaving of the data for the first STA comprises:

when the size of the OFDMA resource unit allocated to the first STA is the first size, deinterleaving the data unit for the first STA using a first set of interleaving parameter values; and when the size of the OFDMA resource unit allocated to the first STA is the second size, deinterleaving the data unit for the first STA using a second set of interleaving parameter values, and wherein the first size is smaller than a size of the transmission channel, the second size is smaller than the first size, and the second set of interleaving parameter values is different from the first set of interleaving parameter values.

* * * * *